US008521865B2

(12) United States Patent
D'Alo et al.

(10) Patent No.: US 8,521,865 B2
(45) Date of Patent: Aug. 27, 2013

(54) METHOD AND APPARATUS FOR POPULATING A SOFTWARE CATALOG WITH AUTOMATED USE SIGNATURE GENERATION

(75) Inventors: Salvatore D'Alo, Rome (IT); Scot MacLellan, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1474 days.

(21) Appl. No.: 11/564,486

(22) Filed: Nov. 29, 2006

(65) Prior Publication Data

US 2007/0150587 A1 Jun. 28, 2007

(30) Foreign Application Priority Data

Dec. 22, 2005 (EP) ..................................... 05112830

(51) Int. Cl.
*G06F 15/173* (2006.01)
(52) U.S. Cl.
USPC ............................. 709/224; 709/226; 709/228
(58) Field of Classification Search
USPC .......................................................... 709/224
See application file for complete search history.

(56) References Cited

U.S. PATENT DOCUMENTS

| | | | | |
|---|---|---|---|---|
| 5,604,862 A | * | 2/1997 | Midgely et al. | 714/6 |
| 5,608,865 A | * | 3/1997 | Midgely et al. | 714/1 |
| 5,758,068 A | * | 5/1998 | Brandt et al. | 726/27 |
| 5,935,243 A | * | 8/1999 | Hasebe et al. | 726/26 |
| 5,991,402 A | * | 11/1999 | Jia et al. | 705/59 |
| 6,108,420 A | * | 8/2000 | Larose et al. | 705/59 |
| 6,823,376 B1 | * | 11/2004 | George et al. | 709/221 |
| 6,978,303 B1 | * | 12/2005 | McCreesh et al. | 709/224 |
| 6,986,063 B2 | * | 1/2006 | Colvin | 726/28 |
| 7,013,373 B2 | * | 3/2006 | Mimatsu et al. | 711/162 |
| 7,415,586 B2 | * | 8/2008 | Mimatsu et al. | 711/162 |
| 7,428,726 B1 | * | 9/2008 | Cowan et al. | 717/122 |
| 7,448,033 B1 | * | 11/2008 | Kruger et al. | 717/175 |
| 7,493,388 B2 | * | 2/2009 | Wen et al. | 709/224 |
| 2002/0026631 A1 | | 2/2002 | Barritz | |
| 2003/0126195 A1 | * | 7/2003 | Reynolds et al. | 709/203 |

(Continued)

FOREIGN PATENT DOCUMENTS

EP 0852349 A 7/1998

OTHER PUBLICATIONS

Softaudit for UNIX: "Product Overview" Whitepaper, May 2004, pp. 1-16 XP002425154 USA.

*Primary Examiner* — Firmin Backer
*Assistant Examiner* — Keyvan Emdadi
(74) *Attorney, Agent, or Firm* — Garg Law Firm, PLLC; Rakesh Garg; Libby Z. Toub

(57) ABSTRACT

A method and a corresponding apparatus for managing software licenses on a plurality of computer are proposed. The present method and system aim at populating a software catalog without the manual intervention of an administrator. The present invention reduces the cost of producing and maintaining a comprehensive knowledge base (the catalog) which contains definitions of software products and the related use signature. Information about software products and their related signature is obtained through a process which gathers information with an automated process which takes an initial snapshot of all processes running on a monitored data processing system and makes a comparison with a final snapshot after execution of a software product has been started. A "use signature" of the software product is then generated according to the difference.

20 Claims, 4 Drawing Sheets

(56) References Cited

U.S. PATENT DOCUMENTS

| | | | |
|---|---|---|---|
| 2004/0054987 A1* | 3/2004 | Sonpar et al. | 717/120 |
| 2004/0128395 A1* | 7/2004 | Miyazaki | 709/229 |
| 2004/0267548 A1* | 12/2004 | Jones | 705/1 |
| 2004/0268120 A1* | 12/2004 | Mirtal et al. | 713/156 |
| 2005/0010733 A1* | 1/2005 | Mimatsu et al. | 711/162 |
| 2005/0021971 A1* | 1/2005 | Patankar et al. | 713/176 |
| 2005/0030893 A1* | 2/2005 | Dropps et al. | 370/229 |
| 2005/0183074 A1* | 8/2005 | Alexander et al. | 717/144 |
| 2006/0073890 A1* | 4/2006 | McAllister et al. | 463/29 |
| 2006/0085613 A1* | 4/2006 | Mimatsu et al. | 711/162 |
| 2007/0150587 A1* | 6/2007 | D'Alo et al. | 709/224 |

* cited by examiner

METHOD AND APPARATUS FOR POPULATING A SOFTWARE CATALOG WITH AUTOMATED USE SIGNATURE GENERATION

TECHNICAL FIELD

The present invention relates to the data processing field. More specifically, the present invention relates to a method of populating a software catalog in a license manager system. In particular the activity of use signature generation is addressed by the present invention. The invention further relates to a computer program for performing the method, and to a product embodying the program. Moreover, the invention also relates to a corresponding apparatus.

BACKGROUND ART

Several system management software applications require the availability of a comprehensive knowledge base that contains information on software products, which may be currently installed and running on a plurality of data processing systems. For example license manager products like IBM Tivoli License Manager (ITLM) needs a knowledge base (i.e. a catalog) to identify the products runnning on the managed systems and correctly metering and invoicing the use of such products. Normally this knowledge base is in the form of a catalog which contains definitions of software products (e.g. product names and version) and the related signatures. The software catalog lists all the known products which can be found on the managed systems; each product can be identified by one or more executable modules indicative of its running. As an example, in the case of a License Manager product, a licensing agent working in the background detects the executable modules that have been launched; the licensing agent then identifies the corresponding products through the software catalog. This is done through the "use signature", i.e. an indication that the product is currently running; normally it is a process. The catalog needs to be "populated" with the software identifications and the related signatures (including the "use signature") and this is normally a costly activity. The term signature means any type of information that can be consumed by a license manager system to determine if a software product is installed or running on a system. Traditionally "use signatures" describe the environmental conditions that are present when the corresponding cataloged software entities are running. This could include the name of a process, or of the executable code that was invoked to initiate the process. A tool will search for a match to the signatures in catalog, on a periodic basis or through some other trigger mechanism and if a match is found a record of the use of the software is recorded along with all of the relevant data that is required to properly manage according to the pricing model that applies to that software. The problem with this approach is in the population and maintenance of the catalog. It is a tricky, tiresome, and time-consuming process to identify signatures for all of the possible software elements, differentiating between different releases also of the same piece of software.

According to known methods normally employed to create product-signature information, one or more of the following actions is performed:

information is directly collected from the software producer (internal development department or independent software vendor);

a technical person who is experienced in a specific software product can manually produce accurate product and signature definitions for that product, or at least for a specific version;

a technical person who is experienced on that software can obtain product definitions by direct inspection of data maintained by the operating system on computers where those products have been installed, then it is possible to manually create signatures for these products based on OS registry values or installed files or both;

a technical person uses software tools that harvest information from a computer where the software is installed, in order to partially automate the activities described above.

All of the above methods have some drawbacks. The first two are only applicable to software products which are internally developed or to products for which in-depth knowledge is available. The other methods require visiting multiple computers where different versions or different maintenance levels of the same software product may be installed, as they may require different signatures. The cost of creating and maintaining the product-signature catalog with the above methods are often prohibitive, which results in incomplete and obsolete content.

In other words the software catalogs must be populated with the help of an operator having a good knowledge of the software products. This is normally accurate, but it's also a quite expensive process. Also it is not always completely reliable since a human intervention is required. An automated catalog population with use signature generation would be highly desirable.

It is an object of the present invention to provide a method and a system which alleviates the above drawbacks.

SUMMARY OF THE INVENTION

According to the present invention we provide a method of populating a software catalog with at least one software product identifier and related use signature indicative of the running of the software product on at least one monitored data processing systems, the method including, for each at least one software product, the steps of: taking an initial snapshot of all running processes on a at least one monitored data processing system and storing the initial snapshot in a system memory; an agent starting execution of the software product on the at least one monitored data processing system; taking a final snapshot of all running processes on the at least one monitored data processing system and storing the final snapshot in a system memory; comparing the initial and final snapshot, determining and storing the difference between the initial and final snapshot in a system memory; and creating a use signature for the software product according to the determined difference.

Another aspect of the present invention provides a method for licensing/metering software products across a plurality of data processing system.

A further aspect of the present invention provides a computer program for performing the above-described method.

A still further aspect of the invention provides a program product embodying this program.

Moreover, another aspect of the invention provides a corresponding apparatus for implementing the above method.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
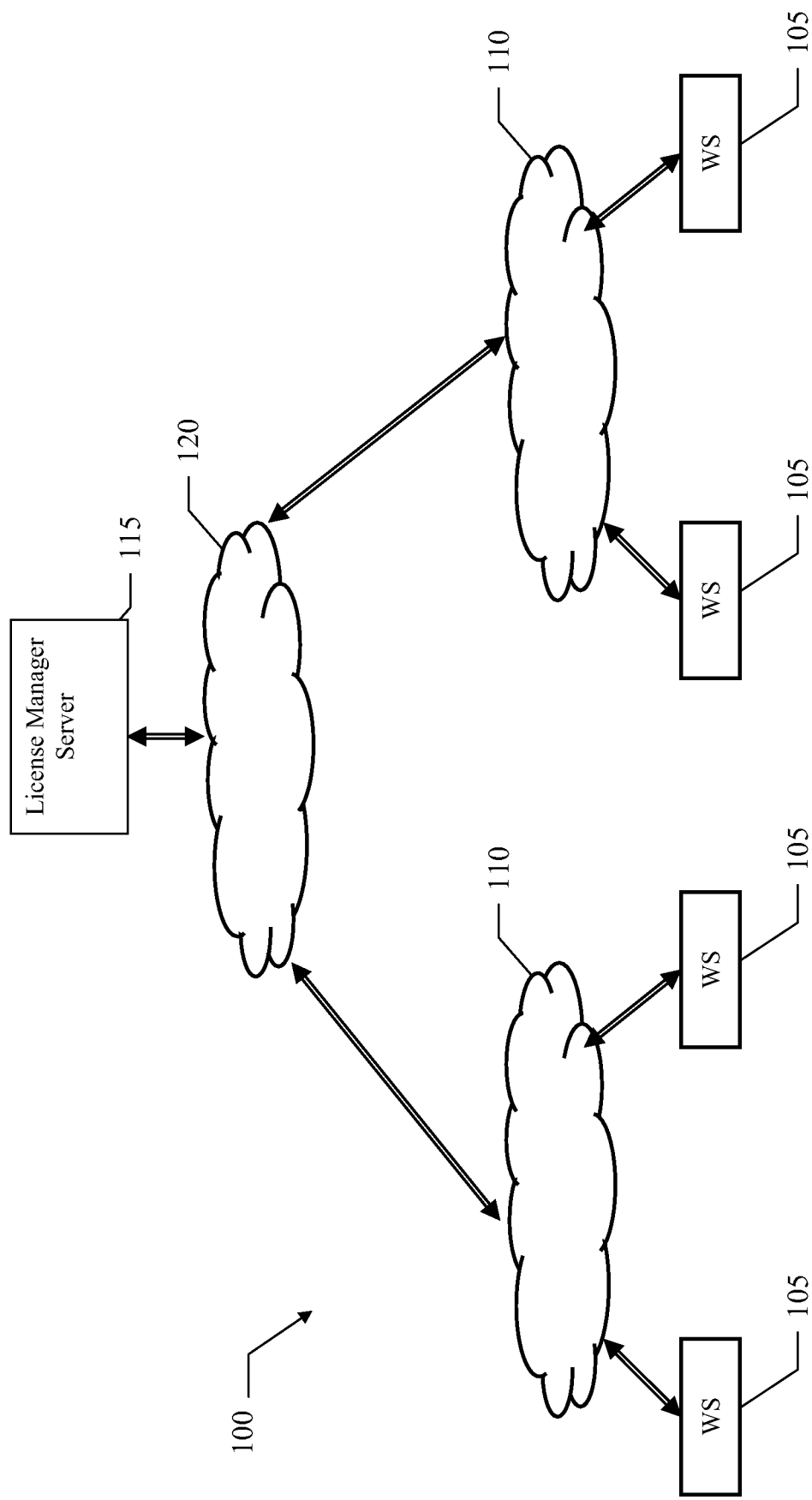
FIG. 1 is a schematic block diagram of a data processing system in which the method of the invention is applicable.

With reference in particular to FIG. 1, a data processing system 100 with distributed architecture implementing a License Manager system, is depicted. The system 100 includes multiple endpoints 105, which are grouped into different sets. The endpoints 105 can be workstations, servers, laptops and more generally any kind of data processing system where a plurality of software products is installed. The endpoints 105 are connected to each other through a network 110 (for example, a LAN). The different sets of endpoints 105 communicate with a remote system management server 115 through a network 120 (for example, INTERNET-based); the system management server 115 implements a central repository where inventory data of the system 100 is collected and managed. As mentioned above, the present invention may be implemented in a license management system, but more generally in any system requiring software catalouging activity.

Figure 2:
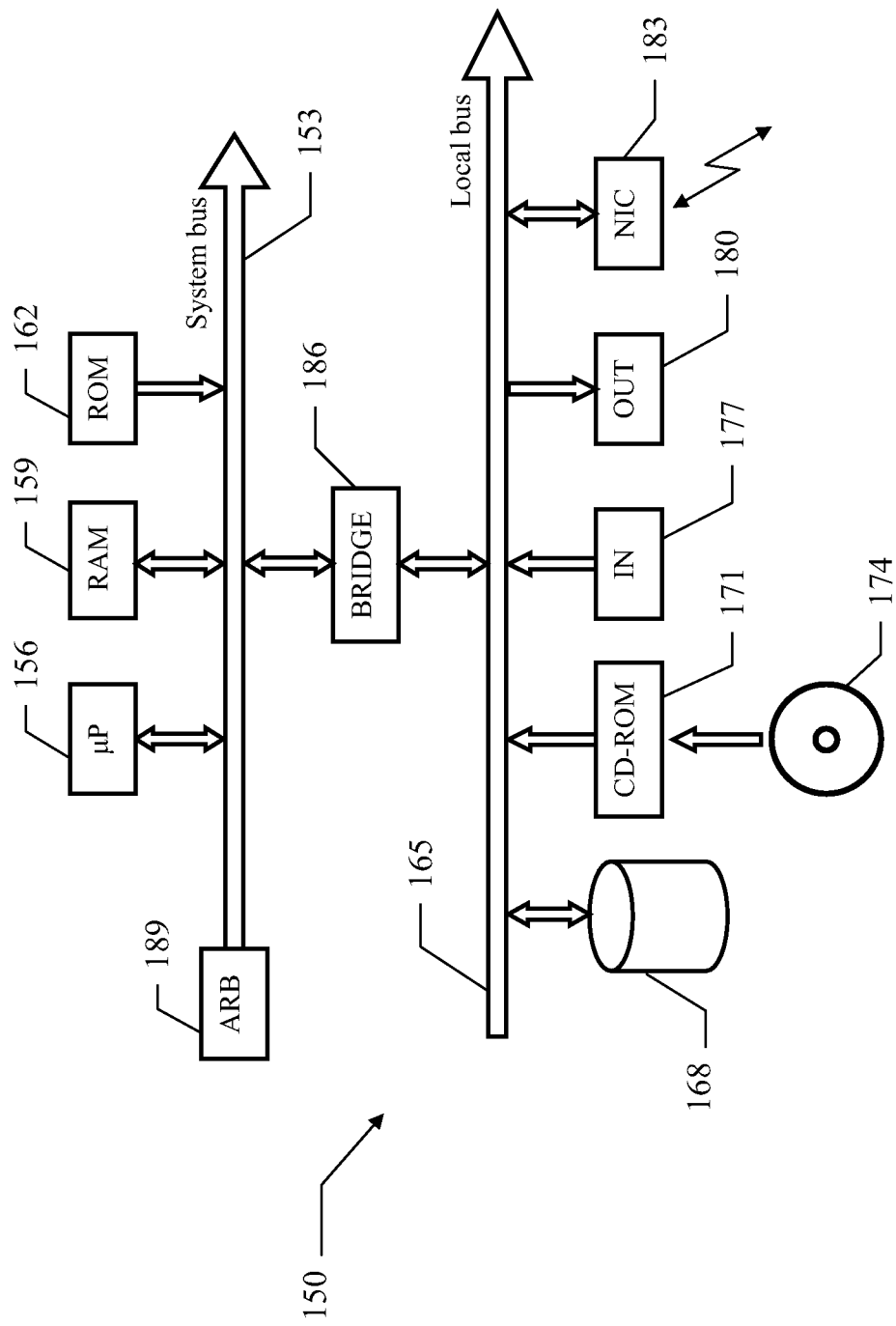
FIG. 2 shows the functional blocks of a generic computer of the system.

As shown in FIG. 2, a generic computer of the system (workstation, local server, or system management server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized.

Figure 3:
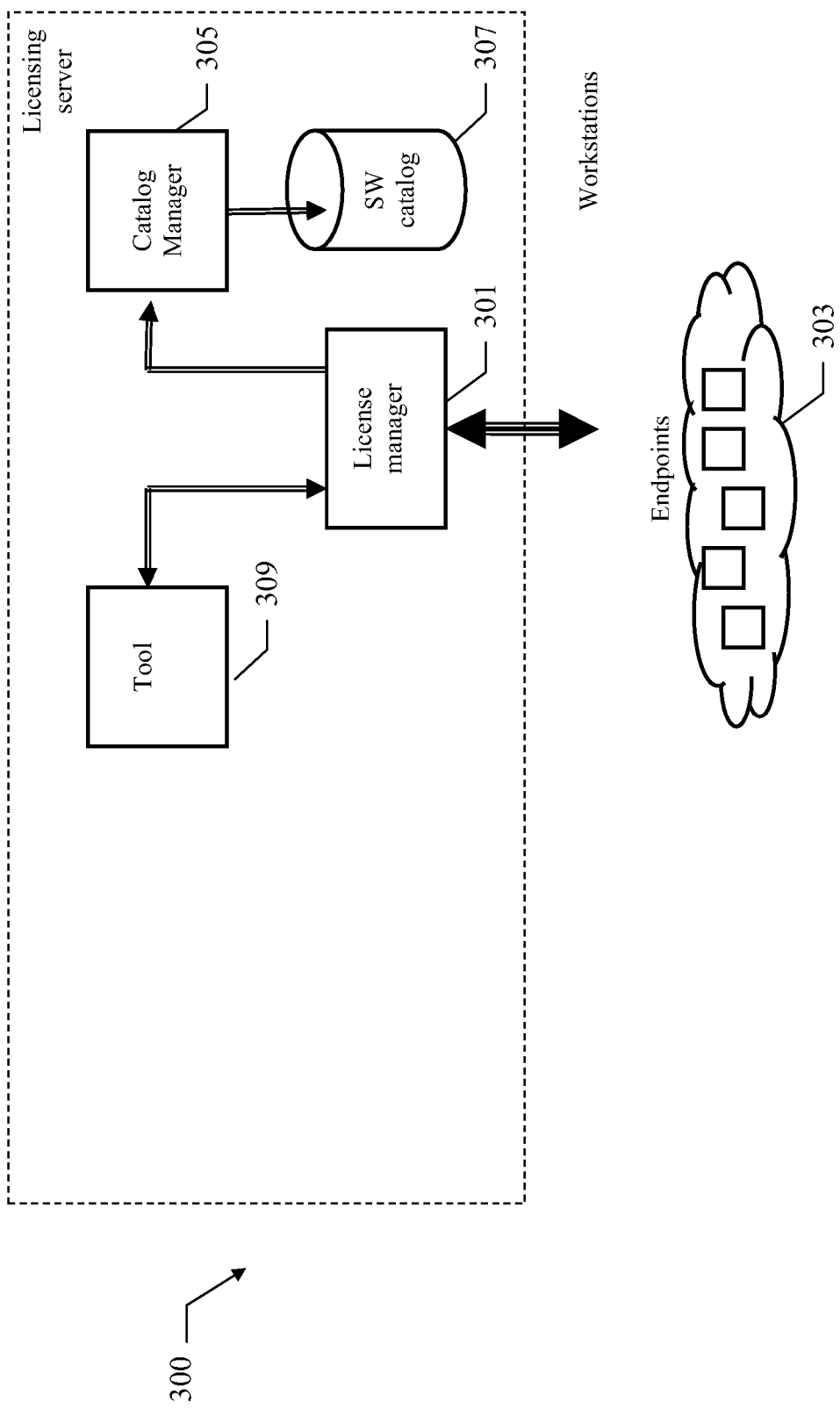
FIG. 3 depicts the main components that can be used for practicing the method.

Considering now FIG. 3, the main components that can be used to practice the method of a preferred embodiment of the invention are denoted as a whole with 300. The information (programs and data) is typically stored on the hard-disks of the different computers and loaded (at least partially) into the corresponding working memories when the programs are running.

A License Manager 301 controls and executes management operations on several endpoints 303, connected by a communication network. The set of endpoints 303 includes servers, workstations, desktops or laptops, whose installed software is analyzed with the objective of enlarging the available base of product definitions and related signatures.

The License Manager 301 controls management operations on a potentially large set of interconnected endpoints 303. This server and the underlying systems management infrastructure are used for licensing/metering the execution of software products. The monitoring operation may be performed on all managed endpoints 303 or on a specific subset, the latter being possibly determined by their role (servers, workstations, desktops or laptops) or by the running operating system.

According to a preferred embodiment of the present invention, the system includes a catalog manager 305 controlling a software catalog 307. The software catalog generally includes three sections:

software product definitions, which gives general information about software products as version, vendor and the like;

information on how to discover if those software products are installed (install signatures) on a specific data processing system.

information on how to discover if those software products are running (use signatures) on a specific data processing system.

The section addressed by the present invention is the third one. According to a preferred embodiment of the present invention, before the start of the monitoring operations, the catalog manager 305 populates the software catalog with the information about the use signature for corresponding Software Products. A signature generation tool 309 will sample the environment to have a view of the process list when the software in question is not active. A snapshot of all processes running on test data processing system (selected among endpoints 303) is taken before a Software Product is started. A second sample (snapshot) is taken after the Software Product has been started. The difference in the lists will reflect the new process that has been started. By recording the details of the new process, and deriving the information that forms its signature, the license manager 301 will be able to identify instances of the software in the future. This simple flow assumes that there is no other activity in the system other than the application starting between the two samples. This will not always be true, and therefore the tool will be built to loop around the sample→start application→sample activities (shutting down the application each time) in order to have a number of different delta results. In this way a new process that coincidently started between the samples will not be mistakenly assumed to be part of the signature, as it is extremely unlikely that the coincidence will be repeated over a number of samples. The number of times that the loop will be executed is configurable, and will be chosen depending on the activity on the system where the signatures are being generated.

This leads to the creation of new product definitions and related signatures. In this way a reliable use signature of the sofware products is generated, without the need of any manual intervention. The method described above populates the catalog with the following information, for a software product X.

SW product X identifier;
SW Product X Use Signature:
Process_1 name;
Process_1 size.
. . .
. . .
Process_n name;
Process_n size.

Where n is the number of processes included in the signature.

In other words, the method described above is used to create and/or populate a Software Catalog 307 (also called Knowledge Base). The Software Catalog 307 is a database storing a set of consolidated product definitions and signatures. The database can be initially empty or it can be populated with data created by a provider of software signatures. The new definitions produced by the analysis application are consolidated in this database.

Figure 4:
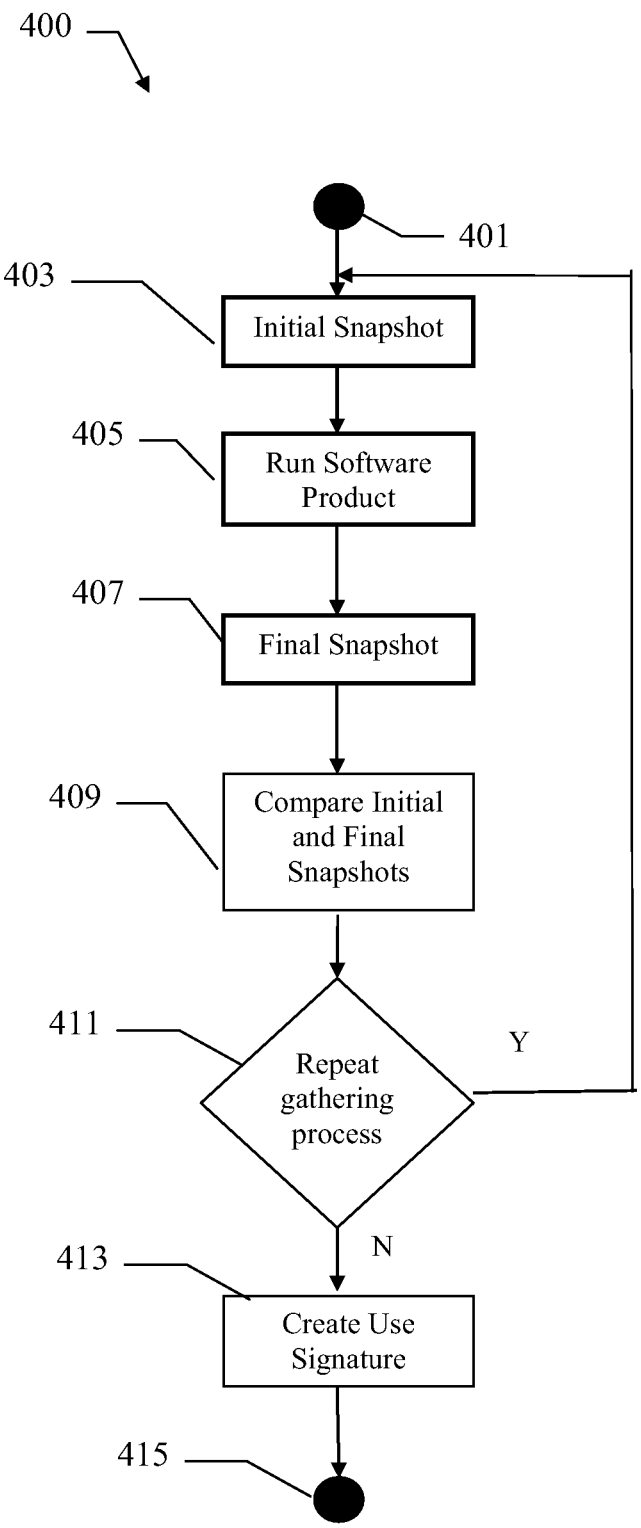
FIGS. 4 shows a diagram describing the flow of activities relating to an illustrative implementation of the method.

Considering now FIG. 4, the logic flow of a knowledge gathering process according to an embodiment of the invention is represented with a method 400. The method is referred to one Software Product and must be repeated for all Software Products for which a use signature is to be generated. It begins at the black start circle 401. Continuing to block 403 to 409 data are gathered throughout the sequence of these steps. Step 403 takes an initial snapshot of all processes currently running on a test data processing system. The snapshot is then stored for future reuse. The Software Product is then run on the test data processing system (step 405) and a second snapshot is taken at step 407 and stored into system memory. Collected data are then compared and executable files are identified at step 409. Corresponding file name and size are then recorded from disk image and control goes to step 411 where it is decided whether to repeat the data gathering process or not. In such case the Software Product is stopped before a new Initial Snapshot is taken. When the cycles of snapshots and comparison operations are finished the use signature is generated (step 413) and the process ends at step 415.

In this way, it's is possible to obtain robust Sw signatures to be used for SW metering/licensing activities.

As an additional feature, in some circumstances, a reliability score could be assigned to each signature, based on several parameters (e.g. the "noise" detected between different loops, or the size of the list of processes identified at each iteration). In the same way the association between a signature and a software product identifier could be assigned a reliability indicator, and a decision of whether to automatically assign the signature to such product could be made dependent on such indicator: if the indicator does not reach a minimum thresholds, the intervention of an administrator could be invoked.

Similar considerations apply if the programs and data are structured in a different manner, if other modules or functions are provided, or if the information is stored in equivalent memory structures.

Similar considerations apply if the method includes equivalent or additional steps.

Alternatively, for example different methods of obtaining the information on the inspected endpoints can be used, depending also on the operating system on which the system is installed.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

In any case, the method of the invention can be used for licensing/metering any kind of software products (such as video games, multimedia works, and the like).

In addition, the programs can be distributed on any other computer readable medium (such as one or more DVDs); alternatively, the programs are pre-loaded onto the hard-disks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of populating a software catalog with at least one software product identifier and related use signature indicative of running of a software product on at least one monitored data processing system, the method comprising:
    taking an initial snapshot of a set of running processes on the at least one monitored data processing system and storing the initial snapshot in a system memory, wherein the initial snapshot is taken prior to starting the software product in the at least one monitored data processing system;
    an agent starting execution of the software product on the at least one monitored data processing system;
    taking a final snapshot of a set of running processes on the at least one monitored data processing system and storing the final snapshot in a system memory, wherein the final snapshot is taken after starting the software product in the at least one monitored data processing system;
    comparing the initial and final snapshots, determining and storing a difference between the initial and final snapshots in the system memory; and
    creating a use signature for the software product according to the determined difference, wherein the use signature includes information indicative of the execution of the software product, such information being consumable by a software license manager to determine one of (i) installation and (ii) use of the software product on the at least one data processing system.

2. The method of claim 1, further including:
    stopping the execution of the software product;
    repeating the taking an initial snapshot, starting execution, taking a final snapshot and comparing; and
    wherein the use signature is created according to the intersection of a plurality of the determined differences, thereby enabling elimination from the use signature of a process that is not a part of the software product execution.

3. The method of claim 2 wherein the stopping and repeating are repeated a plurality of times, and wherein the plurality of repetition times is configurable according to activities on the at least one data processing system.

4. The method of claim 1, wherein the use signature includes the list of running processes included in the differences.

5. The method of claim 4 wherein the use signature includes for each listed running process an indication of the size of the corresponding executable file.

6. The method of claim 1, wherein the method is used to image software licenses for respective software products.

7. The method of claim 6 wherein the catalog includes, for each software product an install signature.

8. A computer program product in a computer readable medium for populating a software catalog with at least one software product identifier and related use signature indicative of running of a software product on at least one monitored data processing system, comprising:
   instructions for taking an initial snapshot of a set of running processes on the at least one monitored data processing system and storing the initial snapshot in a system memory, wherein the initial snapshot is taken prior to starting the software product in the at least one monitored data processing system;
   instructions for an agent starting execution of the software product on the at least one monitored data processing system;
   instructions for taking a final snapshot of a set of running processes on the at least one monitored data processing system and storing the final snapshot in a system memory, wherein the final snapshot is taken after starting the software product in the at least one monitored data processing system;
   instructions for comparing the initial and final snapshots, determining and storing the difference between the initial and final snapshots in the system memory; and
   instructions for creating a use signature for the software product according to the determined difference, wherein the use signature includes information indicative of the execution of the software product, such information being consumable by a software license manager to determine one of (i) installation and (ii) use of the software product on the at least one data processing system.

9. A system for populating a software catalog with at least one software product identifier and related use signature indicative of running of a software product on at least one monitored data processing system, comprising:
   a storage device including a storage medium, wherein the storage device stores computer usable program code; and
   a processor, wherein the processor executes the computer usable program code, and wherein the computer usable program code comprises:
   computer usable code for taking an initial snapshot of a set of running processes on the at least one monitored data processing system and storing the initial snapshot in a system memory, wherein the initial snapshot is taken prior to starting the software product in the at least one monitored data processing system;
   computer usable code for an agent starting execution of the software product on the at least one monitored data processing system;
   computer usable code for taking a final snapshot of a set of running processes on the at least one monitored data processing system and storing the final snapshot in a system memory, wherein the final snapshot is taken after starting the software product in the at least one monitored data processing system;
   computer usable code for comparing the initial and final snapshots, determining and storing the difference between the initial and final snapshots in the system memory; and
   computer usable code for creating a use signature for the software product according to the determined difference, wherein the use signature includes information indicative of the execution of the software product, such information being consumable by a software license manager to determine one of (i) installation and (ii) use of the software product on the at least one data processing system.

10. The computer program product of claim 8, further including:
    instructions for stopping the execution of the software product;
    instructions for repeating the steps of taking an initial snapshot, starting execution, taking a final snapshot and comparing; and
    wherein the use signature is created according to the intersection of a plurality of the determined differences, thereby enabling elimination from the use signature of a process that is not a part of the software product execution.

11. The computer program product of claim 10 wherein the instructions for stopping and repeating are repeated a plurality of times, and wherein the plurality of repetition times is configurable according to activities on the at least one data processing system.

12. The computer program product of claim 8, wherein the use signature includes the list of running processes included in the differences.

13. The computer program product of claim 12 wherein the use signature includes for each listed running process an indication of the size of the corresponding executable file.

14. The computer program product of claim 8, wherein the computer program product is used to image software licenses for respective software products.

15. The computer program product of claim 14 wherein the catalog includes, for each software product an install signature.

16. The system of claim 9, further including:
    computer usable code for stopping the execution of the software product;
    computer usable code for repeating the steps of taking an initial snapshot, starting execution, taking a final snapshot and comparing; and
    wherein the use signature is created according to the intersection of a plurality of the determined differences, thereby enabling elimination from the use signature of a process that is not a part of the software product execution.

17. The system of claim 16 wherein the computer usable code for stopping and repeating are repeated a plurality of times, and wherein the plurality of repetition times is configurable according to activities on the at least one data processing system.

18. The system of claim 9, wherein the use signature includes the list of running processes included in the differences.

19. The system of claim 18 wherein the use signature includes for each listed running process an indication of the size of the corresponding executable file.

20. The system of claim 9, wherein the computer program product is used to image software licenses for respective software products.

* * * * *